UNITED STATES PATENT OFFICE.

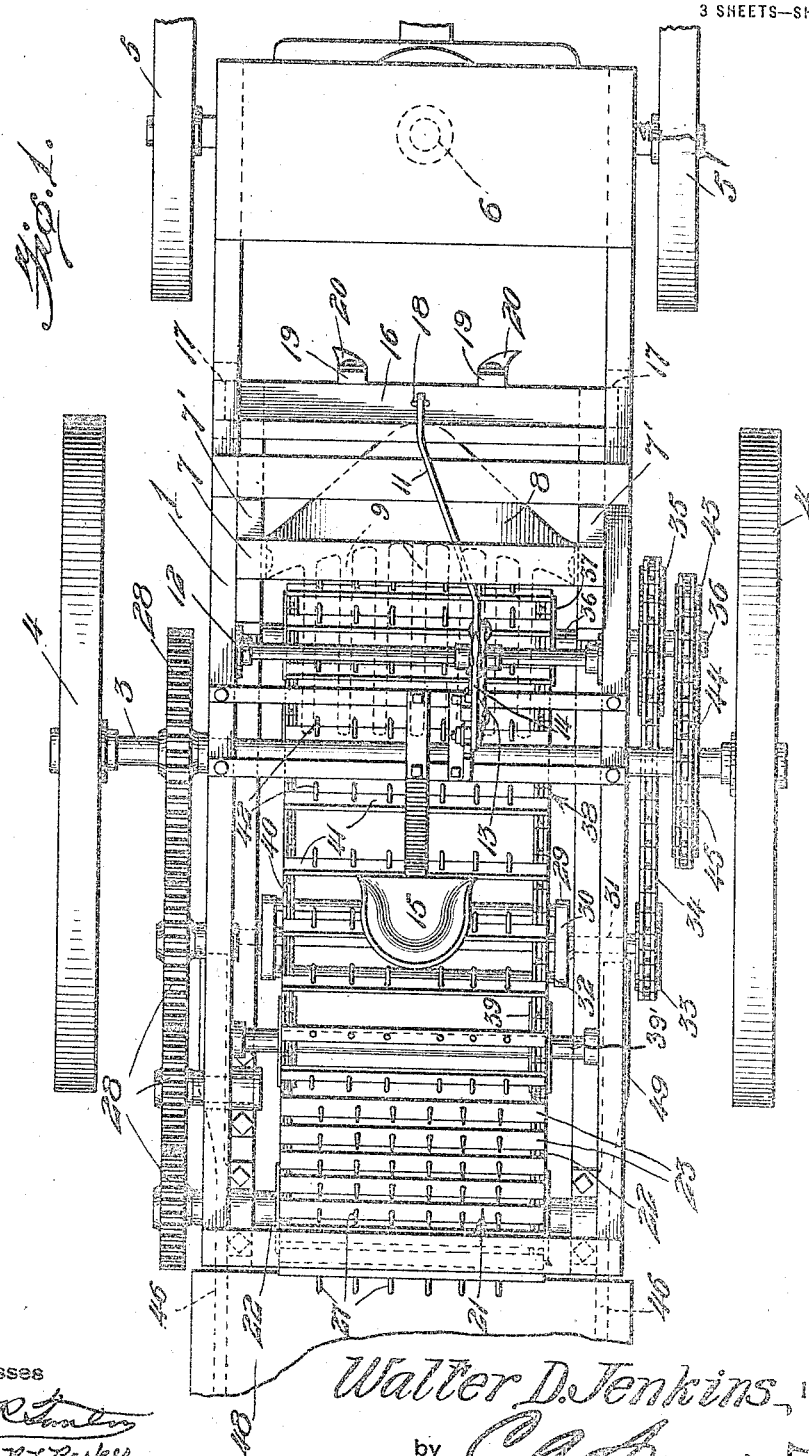

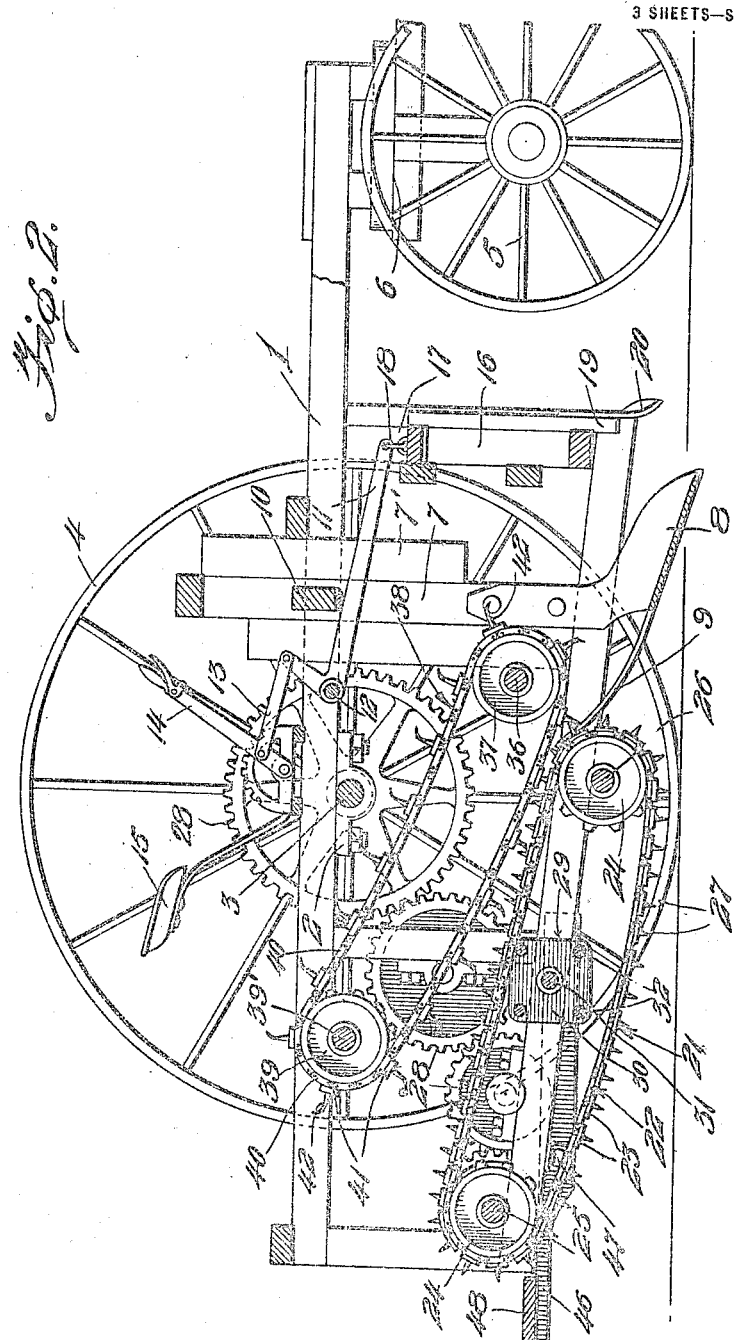

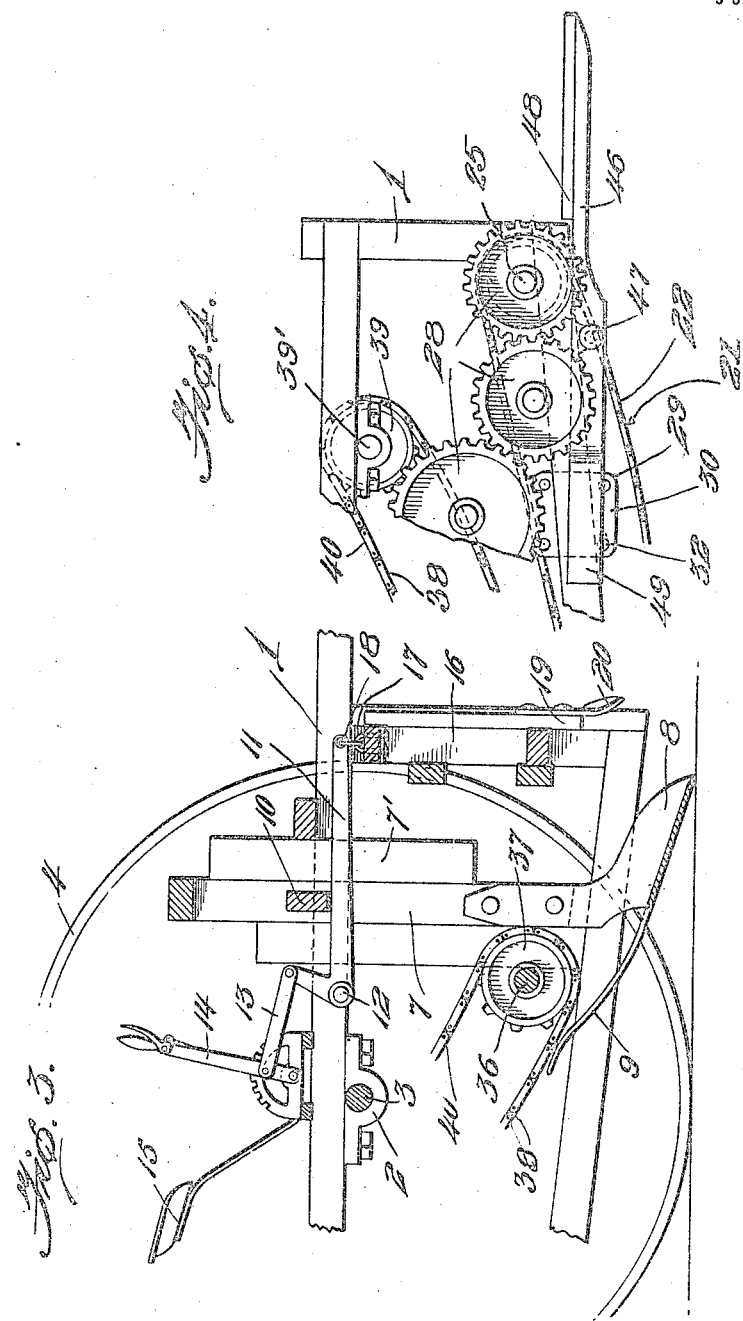

WALTER DEE JENKINS, OF DURHAM, NORTH CAROLINA.

PEANUT-DIGGER.

1,248,335.   Specification of Letters Patent.   Patented Nov. 27, 1917.

Application filed October 5, 1916. Serial No. 123,972.

*To all whom it may concern:*

Be it known that I, WALTER D. JENKINS, a citizen of the United States, residing at Durham, in the county of Durham and State of North Carolina, have invented a new and useful Peanut-Digger, of which the following is a specification.

The present invention appertains to digging and harvesting machines for peanuts, vegetables and the like, and aims to provide a novel and improved machine for digging and harvesting peanuts, although it can be used for other purposes.

It is the object of the invention to provide a machine which is operable in a thoroughly practical and efficient manner for digging and cleaning the peanuts, and for dumping them in piles in order that they can be easily gathered, the present machine saving labor, time and expense.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a plan view of the machine, portions being broken away.

Fig. 2 is a longitudinal section of the machine, portions being shown in elevation.

Fig. 3 is a fragmental section illustrating the shovel blade or scoop and vine deflecting blades in raised position.

Fig. 4 is a fragmental side elevation illustrating the dumping board.

In carrying out the invention, there is provided a suitable frame 1 provided between its ends with a pair of bearings 2 through which the rear driving axle 3 is journaled, suitable ground wheels 4 being mounted upon the ends of the axle 3, and pawl and ratchet devices (not shown) can be provided between the wheels 4 and axle 3 to permit of the turning of corners, as is well known in the art. The front steering wheels 5 are connected by a fifth wheel 6 with the forward end of the frame 1, and the machine is adapted to be drawn by draft animals, or it can be propelled by engine or prime mover carried thereby, which needs no detailed illustration or description.

The frame 1 is provided with a suitable vertical guide 7' therein in advance of the axle 3, and a vertical digger frame 7 is slidable vertically in the guide 7', and carries the digger at its lower end. This digger embodies a shovel blade or scoop 8 having upturned side portions secured to the side members of the frame 7, and the shovel blade 8 has a forwardly projecting nose to enter the ground to deflect the soil and vines onto the blade 8 as the machine is moved forwardly. The blade 8 is provided at its rear edge with upwardly and rearwardly projecting inclined resilient fingers or teeth 9. The lowermost or intermediate portion of the shallow blade 8 is inclined so that its nose projects downwardly and forwardly to enter the ground below the peanuts. The frame 7 has a cross piece 10 resting upon a forwardly projecting lever 11 fulcrumed to the frame 1, as at 12, and the lever 11 can be so constructed as to be operated by the foot of the operator, although as illustrated, it is connected by a link 13 with a hand lever 14 that can be operated by the operator seated on the seat 15 carried by the frame. By swinging the lever 11 upwardly and downwardly, the shovel blade 8 can be raised and lowered. When the lever 11 is swung downwardly, the frame 7 gravitates, and the engagement of the blade 8 with the soil will tend to direct the blade downwardly into the soil. The blade can be readily raised above the soil by swinging the lever 11 upwardly, and it is thus possible to adjust the blade properly under the various conditions.

A second sliding frame 16 is slidable vertically in a vertical guide 17 carried by the main frame 1 in front of the guide 7', and the upper portion of the frame or slide 16 is loosely connected, as at 18, with the forward projecting end of the lever 11, whereby the frame 16 as well as the frame 7 is raised and lowered by the lever 11 to simultaneously operate said frames. The frame 16 has a pair of laterally spaced depending members 19 to which vine deflecting blades 20 are secured to pass along the opposite sides of a row of peanuts over which the machine passes. The blades 20, when they are lowered, serve to loosen the vines of the peanuts at the sides of the row, and deflect them inwardly, whereby the vines are properly taken up by the shovel blade 8 without dangling too far to the opposite sides. The blades 20 also serve as colters to slit the soil at the opposite sides of the row whereby the soil is readily raised by the shovel blade 8 with the peanuts. The blades 20 are brought into and out of operative position simultaneously with the shovel blade 8, and are readily controlled by the operator during the operation of the machine.

In order to remove the vines from the fingers 9 and carry them rearwardly, there is provided an endless belt 21 of suitable width within the lower portion of the frame in rear of the blade 8, and this belt embodies the endless sprocket chains 22 at the edges thereof connected by the transverse slats 23. The chains 22 are trained around sprocket wheels 24 secured upon transverse shafts 25 and 26 journaled to the frame in any suitable manner. The shaft 26 is located below the rear free ends of the fingers 9, and the shaft 25 is located at the rear of the frame at a slightly higher level than the shaft 26. The forward portion of the belt 21 passes under the fingers 9, and the slats 23 have pins or elements 27 to move upwardly and rearwardly between the fingers 9, whereby to catch hold of the vines on the fingers 9 and carry them rearwardly, the upper run of the belt 21 moving rearwardly. One end of the shaft 25 is connected by a train of gears 28 with the axle or shaft 3, whereby when the machine is moved forwardly, the belt 21 is operated at the proper velocity.

An agitator or shaker 29 is mounted below the upper run of the belt 21 and embodies end plates 30 mounted upon a rotatable shaft 31 journaled to the frame, and longitudinal parallel rods 32 terminally attached to the plates 30 and engageable upwardly with the upper run of the belt 21. Thus, when the agitator or shaker 29 is rotated, the rods 32 in striking the upper run of the belt 21, will shake or agitate the vines upon the belt, whereby the dirt, sand and other particles will be sifted downwardly through the belt, to clean the vines. The agitator 29 is rotated by means of a pulley or sprocket wheel 33 secured upon one end of the shaft 31 and connected by a belt or sprocket chain 34 with a pulley or sprocket wheel 35 secured upon a transverse shaft 36 journaled to the frame above the fingers 9.

Sprocket wheels 37 are mounted upon the shaft 36, and an endless belt 38 passes around the sprocket wheels 37 and other sprocket wheels 39 mounted upon a shaft 39' above the belt 21. The belt 38 embodies sprocket chains 40 passing around the sprocket wheels 37 and 39, and transverse slats 41 secured to the chains 40 and having outstanding hook-shaped pins 42 movable between the pins 27. The lower run of the belt 38 coöperates with the upper run of the belt 21, and moves rearwardly slower than the upper run of the belt 21. The belt 38 is operated from the axle or shaft 3, by means of a pulley or sprocket wheel 43 secured to one end of the shaft 36 and connected by a belt or sprocket chain 44 with a pulley or sprocket wheel 45 upon the axle or shaft 3. The belt 38 is thus operated when the machine is operated, and motion is transmitted from the shaft 36 to the agitator or shaker 29.

In operation, when the machine is moved forwardly over the row of peanuts, and the blades 20 and 8 are lowered, the blades 20 raise the vines at the opposite sides of the row and deflect them inwardly to be taken up by the shovel blade 8, which also raises the soil and roots, together with the peanuts onto the fingers 9, from which the vines are taken up by the hooks 42 of the belt 38. The vines are thus carried rearwardly onto the belt 21, and are shaken, to loosen the dirt, which sifts downwardly through the belt. The belt 21 being operated faster than the belt 38 will also agitate and loosen the vines, since the pins 27 will move the vines rearwardly faster than the belt 38, and this will loosen the vines from the pins or hooks 42. The rear portion of the belt 38 is spaced above and terminates short of the rear portion of the belt 21, and the vines are delivered from the rear portion of the belt 21.

When it is desired to dump the vines in piles at intervals, to facilitate the gathering of the vines, a dumping device is employed at the rear end of the frame 1. This device embodies a pair of longitudinal side levers 46 fulcrumed between their ends, as at 47, to the rear portion of the frame 1 and having their rear arms projecting rearwardly from the frame and carrying a dumping board 48 immediately in rear of the rear portion of the belt 21 to receive the vines therefrom. The forward arms of the levers 46 have weights 49, whereby to normally hold the board 48 in raised position. After the vines have accumulated upon the board 48 sufficiently to overbalance the weights 49, the board 48 is swung downwardly by the weight of the vines, and will thus be tilted so that the vines are dumped onto the ground in a heap or pile. The board 48 when emptied is again raised by the weights, and as the vines are caught by the board they are dumped intermittently.

Having thus described the invention, what is claimed as new is:

A digging and harvesting machine embodying a wheel mounted frame, a vertically adjustable shovel blade carried by the frame and having upwardly and rearwardly projecting resilient fingers, an endless belt carried by the frame having its forward portion below said fingers and having outstanding elements movable upwardly and rearwardly between said fingers with the upper run of said belt, and a second endless belt carried by the frame above the aforesaid belt with its forward portion above said fingers and in advance of the forward portion of the aforesaid belt, the second mentioned belt having outstanding elements movable downwardly and rearwardly toward said fingers with the lower run of the second mentioned belt, said fingers being movable upwardly and downwardly between the forward portion of the first mentioned belt and the lower run of the second mentioned belt when said shovel blade is raised and lowered, and the lower run of the second mentioned belt extending at an angle away from the upper run of the first mentioned belt from the forward portion thereof.

In testimony that I claim the foregoing as my own, I have hereto affixed my signature in the presence of two witnesses.

WALTER DEE JENKINS.

Witnesses:
P. M. BUSSELL,
W. K. DENNIS.

Copies of this patent may be obtained for five cents each, by addressing the "Commissioner of Patents, Washington, D. C."